United States Patent [19]

Goel

[11] Patent Number: 4,549,005
[45] Date of Patent: Oct. 22, 1985

[54] CURED POLYMERIC MATERIAL PREPARED BY REACTING AN AZADIOXABICYCLOOCTANE WITH A POLYISOCYANATE IN THE PRESENCE OF MOISTURE

[75] Inventor: Anil B. Goel, Worthington, Ohio

[73] Assignee: Ashland Oil, Inc., Ashland, Ky.

[21] Appl. No.: 658,969

[22] Filed: Oct. 9, 1984

[51] Int. Cl.$^4$ .............................................. C08G 18/38
[52] U.S. Cl. ...................................... 528/53; 528/54; 528/58; 528/67; 528/73
[58] Field of Search ...................... 528/54, 73, 53, 58, 528/67

[56] References Cited

U.S. PATENT DOCUMENTS 4,101,527  7/1978  Cunningham et al. ............... 528/73

FOREIGN PATENT DOCUMENTS 2344607  3/1975  Fed. Rep. of Germany .

Primary Examiner—Maurice J. Welsh
Attorney, Agent, or Firm—John F. Jones

[57] ABSTRACT

A process for the preparation of novel polymeric products which involves the reaction of mixtures of bicyclic amide acetals and polyisocyanates with moisture is described.

11 Claims, No Drawings

CURED POLYMERIC MATERIAL PREPARED BY REACTING AN AZADIOXABICYCLOOCTANE WITH A POLYISOCYANATE IN THE PRESENCE OF MOISTURE

CROSS-REFERENCE TO RELATED PATENT APPLICATIONS

The Bicyclic amide acetals useful in this invention and their manufacture are more fully described in the copending U.S. patent applications of Anil B. Goel, Ser. No. 641,238; and Anil B. Goel and Harvey J. Richards, Ser. No. 641,242, both filed on Aug. 16, 1984.

This invention relates to the process for the preparation of useful polymers by reaction of bicyclic amide acetals and polyisocyanates in the presence of moisture and to the novel polymer products.

Bicyclic amide acetals have been hydrolyzed with an excess of water in Ann. Chem. 716, 135(1968). The use of mixtures of bicyclic amide acetals and polyisocyanates in moisture-cure systems has not been described previously.

I have discovered that mixtures of bicyclic amide acetals and polyisocyanates will polymerize in the presence of moisture to produce valuable polymers useful as coatings, adhesives, and the like. The polymerization which occurs in my process is particularly advantageous in that no volatile materials are produced during the polymerization reaction so that under normal conditions no foaming or bubble formation occurs. This is highly desirable in the case in which my polymerization process is used to produce coatings.

The bicyclic amide acetals useful in the process of my invention are those which conform to the formula (I).

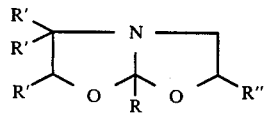

Wherein R is a hydrocarbon group having from 1 to 18 carbon atoms and preferably an alkyl group having from 1 to 18 carbon atoms or an aryl or alkaryl group having from 6 to 12 carbon atoms; R' can be independently selected and represents hydrogen, a hydrocarbon group having from 1 to 18 carbon atoms or an ether group having from 2 to 18 carbon atoms; and R" represents hydrogen, a hydrocarbon group having from 1 to 18 carbon atoms, and an ether group having from 2 to 18 carbon atoms.

The polyisocyanates useful in the process of my invention are those isocyanate compounds which contain at least two isocyanate groups per molecule and included in this group are monomeric, oligomeric and polymeric isocyanate compounds which comply with the foregoing requirement. Polyisocyanates useful in this invention are organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentane 1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylylene-1,4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two as more fully disclosed in U.S. Pat. Nos. 3,350,362 and 3,382,215. Polyisocyanates which are polymeric in nature including isocyanate prepolymers of all types are included in this invention.

The process of this invention can be carried out at or about room temperature or above, if desired, usually for relatively short reaction times.

Although a catalyst is not required in the process of this invention, it is sometimes desirable to use a catalyst such as an amine, an amino alcohol, a metal salt such as dibutyl tin dilaurate, stannous octoate, and the like.

The amount of moisture required for the polymerization reaction of this invention can vary from just a trace to an equal molar amount in respect to the bicyclic amide acetal used in the process.

Although the exact mechanism whereby the reaction involved in the process of this invention is not known with any degree of certainty, it is possible that the bicyclic amide acetal reacts with moisture to form the corresponding amide diol [HOCH$_2$CH$_2$N(COR)CH$_2$CH(R')OH], wherein R and R' have the foregoing designations which amide diol then reacts with the isocyanate groups to form the novel polymeric polyamide-polyurethane materials of this invention. The amide diol itself may possibly act as a promoter in the polymerization reaction of this process.

The invention is further illustrated in the following examples.

EXAMPLE 1

A mixture of 4.3 g of a bicyclic amide acetal (Formula I, R=—CH$_2$CH$_3$, R'=—H, R"=—CH$_2$OCH$_2$CH=CH$_2$) and 8.4 g of hexamethylene diisocyanate trimer was applied to a clean glass plate as a 1 mil thick film. The film was allowed to stand at room temperature in the open atmosphere for two days during which it cured to give a clear, colorless film. The following tests were performed.

Mars (Scratch test with fingernail)—Slightly
Ribbons (Non-brittleness)—Yes
MEK Rubs (Number of rubs before film is attacked)—105

SOLVENT TESTS:

H$_2$O—Pass (Does not dissolve in 24 hrs.)
5%NaOH—Pass (Does not dissolve in 24 hrs.)
Xylene—Pass (Does not dissolve in 24 hrs.)
10%H$_2$SO$_4$—Slight Bubbling on Exposure

EXAMPLE 2

The procedure of Example 1 was repeated except that one drop of dibutyltin dilaurate was added to the mixture prior to applying it to the glass plate. The resulting film was found to cure within 5 hours and tests on the film showed results similar to those of Example 1.

EXAMPLE 3

The procedure of Example 2 was repeated except that R″ in Formula I was —C₆H₅. Results similar to those in Example 2 were obtained.

EXAMPLE 4

The procedure of Example 1 was followed using 2.15 g of the bicyclic amide acetal, 7.30 g of a mixture of toluene disocyanate and hexamethylene diisocyanate trimer and a drop of a tertiary amine catalyst in the mixture. A film of 2 mils thickness was applied to a clean glass plate and overnight cure at room temperature in the open atmosphere produced a tough film which was not affected by exposure to methyl ethyl ketone, toluene, water or 5% aqueous NaOH.

I claim:

1. The process for preparing a cured polymeric material comprising mixing a compound conforming to the formula

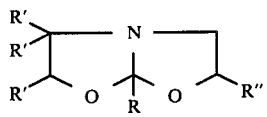

wherein R is a hydrocarbon group having from 1 to 18 carbon atoms and R' can be independently selected and represents hydrogen, a hydrocarbon group having from 1 to 18 carbon atoms or an ether group having from 2 to 18 carbon atoms; and R″ represents hydrogen, a hydrocarbon group having from 1 to 18 carbon atoms and an ether group having from 2 to 18 carbon atoms, with a polyisocyanate compound having at least two isocyanate groups per molecule and allowing the resulting mixture to react in the presence of moisture.

2. The cured polymeric material which results from the process of claim 1.

3. The process of claim 1 carried out at or about room temperature or above.

4. The process of claim 3 wherein the moisture is present in from just a trace up to an equal molar amount based on the moles of bicyclic amide acetal present.

5. The process of claim 4 wherein there is also included a catalyst.

6. The process of claim 4 wherein R is —CH₂CH₃ and R' is —CH₂OCH₂CH=CH₂.

7. The process of claim 4 wherein R is —CH₂CH₃ and R' is —C₆H₅.

8. The process of claim 5 wherein the catalyst is a tertiary amine.

9. The process of claim 5 wherein the catalyst is dibutyl tin dilaurate.

10. The process of claim 4 wherein the polyisocyanate is hexamethylene diisocyanate trimer.

11. The process of claim 4 wherein the polyisocyanate is a mixture of toluene diisocyanate and hexamethylene diisocyanate trimer.

* * * * *